United States Patent
Inomata et al.

(10) Patent No.: US 12,340,949 B2
(45) Date of Patent: Jun. 24, 2025

(54) MULTILAYER CERAMIC ELECTRONIC DEVICE, CIRCUIT SUBSTRATE AND MANUFACTURING METHOD OF MULTILAYER CERAMIC ELECTRONIC DEVICE

(71) Applicant: TAIYO YUDEN CO., LTD., Tokyo (JP)

(72) Inventors: Yasuyuki Inomata, Tokyo (JP); Tetsuo Shimura, Tokyo (JP); Masaki Mochigi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 104 days.

(21) Appl. No.: 18/299,520

(22) Filed: Apr. 12, 2023

(65) Prior Publication Data

US 2023/0352245 A1    Nov. 2, 2023

(30) Foreign Application Priority Data

Apr. 27, 2022   (JP) .................. 2022-073403

(51) Int. Cl.
*H01G 4/232*    (2006.01)
*H01G 4/008*    (2006.01)
(Continued)

(52) U.S. Cl.
CPC .............. *H01G 4/30* (2013.01); *H01G 4/008* (2013.01); *H01G 4/012* (2013.01); *H01G 4/1227* (2013.01); *H01G 4/232* (2013.01)

(58) Field of Classification Search
CPC .......... H01G 4/30; H01G 4/008; H01G 4/012; H01G 4/1227; H01G 4/0085;
(Continued)

(56) References Cited

U.S. PATENT DOCUMENTS 4,576,689 A * 3/1986 Makkaev ............... H01G 4/008
205/159
5,781,402 A * 7/1998 Fujiyama ............ C22C 32/0089
361/321.4
(Continued)

FOREIGN PATENT DOCUMENTS

JP    2003-063867 A    3/2003
JP    2005-228904 A    8/2005
(Continued)

*Primary Examiner* — Dion R. Ferguson
(74) *Attorney, Agent, or Firm* — CHEN YOSHIMURA LLP

(57) ABSTRACT

A multilayer ceramic electronic device includes a multilayer chip having a plurality of dielectric layers and a plurality of internal electrode layers, one end of each of the plurality of internal electrode layers being exposed from the multilayer chip, an external electrode that is provided on an end face of the multilayer chip and is electrically connected to the one end of at least some of the plurality of internal electrode layers and includes a glass component, the end face being an end of the multilayer chip in a direction in which the plurality of internal electrode layers extend. The external electrode includes a crystal contacting or extending into the glass component at an interface between the external electrode and the end face of the multilayer chip. The crystal includes an element that is the same as at least one of elements included in the plurality of dielectric layers.

20 Claims, 8 Drawing Sheets

(51) Int. Cl.
*H01G 4/012* (2006.01)
*H01G 4/12* (2006.01)
*H01G 4/30* (2006.01)

(58) Field of Classification Search
CPC .... H01G 4/1209; H01G 4/232; H01G 4/2325;
H01G 4/12; H01G 2/065; H01G 13/003;
H05K 1/181
See application file for complete search history.

(56) References Cited

U.S. PATENT DOCUMENTS

| | | | |
|---|---|---|---|
| 10,861,649 B2 * | 12/2020 | Nakamura | H01G 4/30 |
| 11,823,842 B2 * | 11/2023 | Iguchi | H01G 4/1227 |
| 2019/0031565 A1 * | 1/2019 | Nakamura | H01G 4/2325 |
| 2022/0076892 A1 * | 3/2022 | Bultitude | C04B 35/486 |
| 2022/0285098 A1 * | 9/2022 | Iguchi | H01G 4/1227 |
| 2023/0352245 A1 * | 11/2023 | Inomata | H01G 4/008 |

FOREIGN PATENT DOCUMENTS

| | | | | |
|---|---|---|---|---|
| JP | 3743406 B2 * | 2/2006 | | B32B 18/00 |
| JP | 3804474 B2 * | 8/2006 | | B82Y 30/00 |
| WO | WO-2013047646 A1 * | 4/2013 | | C04B 35/486 |

* cited by examiner

MULTILAYER CERAMIC ELECTRONIC DEVICE, CIRCUIT SUBSTRATE AND MANUFACTURING METHOD OF MULTILAYER CERAMIC ELECTRONIC DEVICE

FIELD

A certain aspect of the present disclosure relates to a multilayer ceramic electronic device, a circuit substrate and a manufacturing method of the multilayer ceramic electronic device.

BACKGROUND

Multilayer ceramic electronic devices such as multilayer ceramic capacitors are being developed (for example, see Document 1 and Document 2).

PRIOR ART

Patent Document

Document 1: Japanese Patent Application Publication No. 2003-063867
Document 2: Japanese Patent Application Publication No. 2005-228904

SUMMARY OF THE INVENTION

Multilayer ceramic electronic devices are used in various kinds of electrical equipment. However, the number of in-vehicle applications has increased significantly due to the recent shift to electronic control and electric vehicles. For this reason, the demand for reliability at the time of mounting is also high.

First, it is required that the external electrodes have sufficient bonding strength. However, when the temperature (baking temperature) at which the external electrodes are baked is low, there is a risk that the external electrodes do not have sufficient bonding strength. Therefore, it is conceivable to raise the baking temperature of the external electrodes. However, when the baking temperature of the external electrodes is increased, cracks may occur and the moisture resistance may decrease. Thus, it is difficult to achieve high reliability.

The present invention has been made in view of the above problems, and an object of the present invention is to provide a multilayer ceramic electronic component, a circuit board, and a manufacturing method of the multilayer ceramic electronic component that can achieve high reliability.

According to a first aspect of the embodiments, there is provided a multilayer ceramic electronic device including: a multilayer chip having a plurality of dielectric layers and a plurality of internal electrode layers that face each other and are stacked together with the plurality of dielectric layers interposed therebetween, one end of each of the plurality of internal electrode layers being exposed from the multilayer chip; and an external electrode that is provided on an end face of the multilayer chip and is electrically connected to the one end of at least some of the plurality of internal electrode layers and includes a glass component, the end face being an end of the multilayer chip in a direction in which the plurality of internal electrode layers extend, wherein the external electrode includes a crystal contacting or extending into the glass component at an interface between the external electrode and the end face of the multilayer chip, and wherein the crystal includes an element that is the same as at least one of elements included in the plurality of dielectric layers.

In the multilayer ceramic electronic device, the element that is the same as at least one of elements included in the plurality of dielectric layers may be barium.

In the multilayer ceramic electronic device, the crystal may be a needle-like crystal or a rod-like crystal.

In the multilayer ceramic electronic device, a lengthwise dimension of the crystal may be 100 nm or more.

In the multilayer ceramic electronic device, the plurality of dielectric layers may include zirconate.

In the multilayer ceramic electronic device, a main component of the external electrode may be copper.

In the multilayer ceramic electronic device, the multilayer ceramic electronic device may be a Class 1 capacitor.

According to a second aspect of the embodiments, there is provided a circuit substrate including: a substrate; and the above-described multilayer ceramic electronic device mounted on the substrate.

According to a third aspect of the embodiments, there is provided a manufacturing method of a multilayer ceramic electronic device including: activating a surface of an end face of a multilayer chip, the multilayer chip having a plurality of dielectric layers and a plurality of internal electrode layers that face each other and are stacked together with the plurality of dielectric layers interposed therebetween, one end of each of the plurality of internal electrode layers being exposed from the multilayer chip, the end face being an end of the multilayer chip in a direction in which the plurality of internal electrode layers extend; forming an external electrode on the surface activated in the activating, by applying an external electrode paste including a glass component on the surface and baking the external electrode paste; and forming a crystal in the external electrode, the crystal including an element which is the same as at least one of elements included in the plurality of dielectric layers, the crystal contacting or extending into the glass component at an interface between the external electrode and the surface of the end face of the multilayer chip.

In the method, the element which is the same as at least one of elements included in the plurality of dielectric layers may be barium.

In the activating of the method, the surface may be immerged into acid or the surface is subjected to a sandblast process.

In the method, hydrochloric acid may be used in the activating.

In the forming of the external electrode of the method, the crystal may be formed by dissolving said element in the glass component and, after that, reprecipitating said element.

In the method, the crystal may be a needle-like crystal or a rod-like crystal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION

Hereinafter, an exemplary embodiment will be described with reference to the accompanying drawings.

Figure 1:
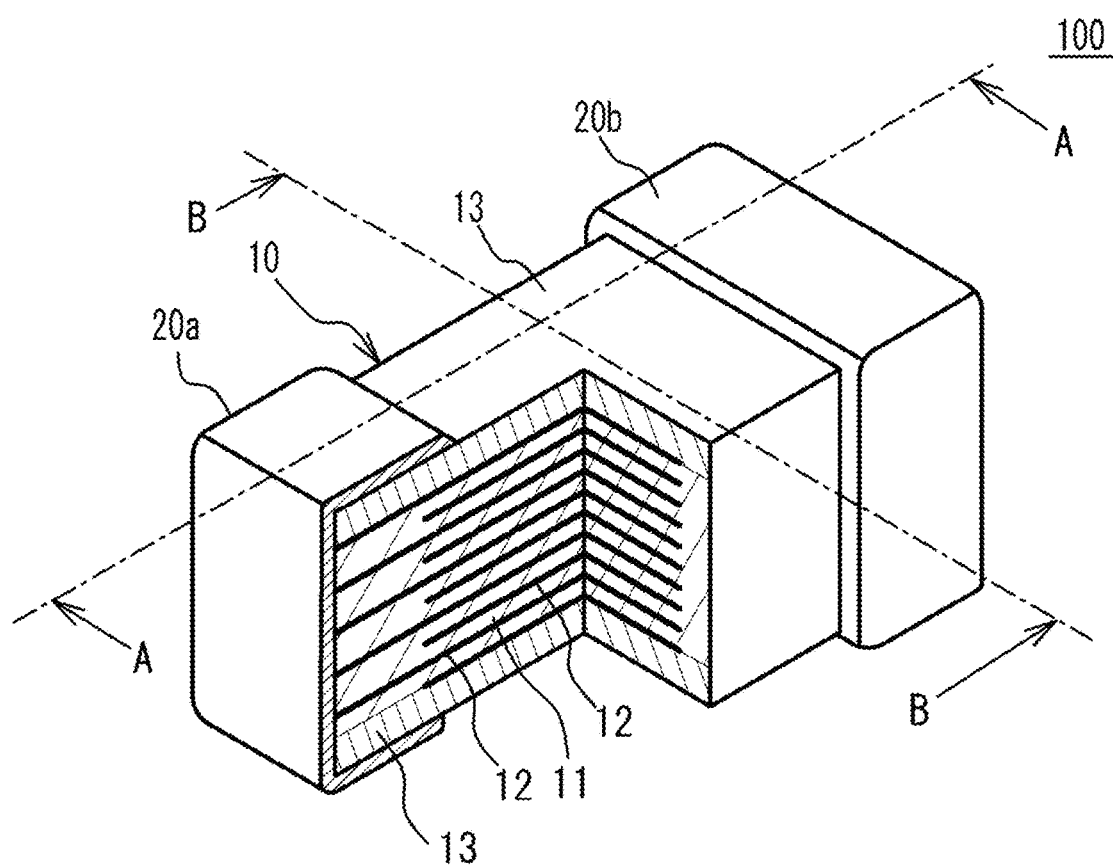
FIG. 1 is a partial cross-sectional perspective view of a multilayer ceramic capacitor.
Figure 2:
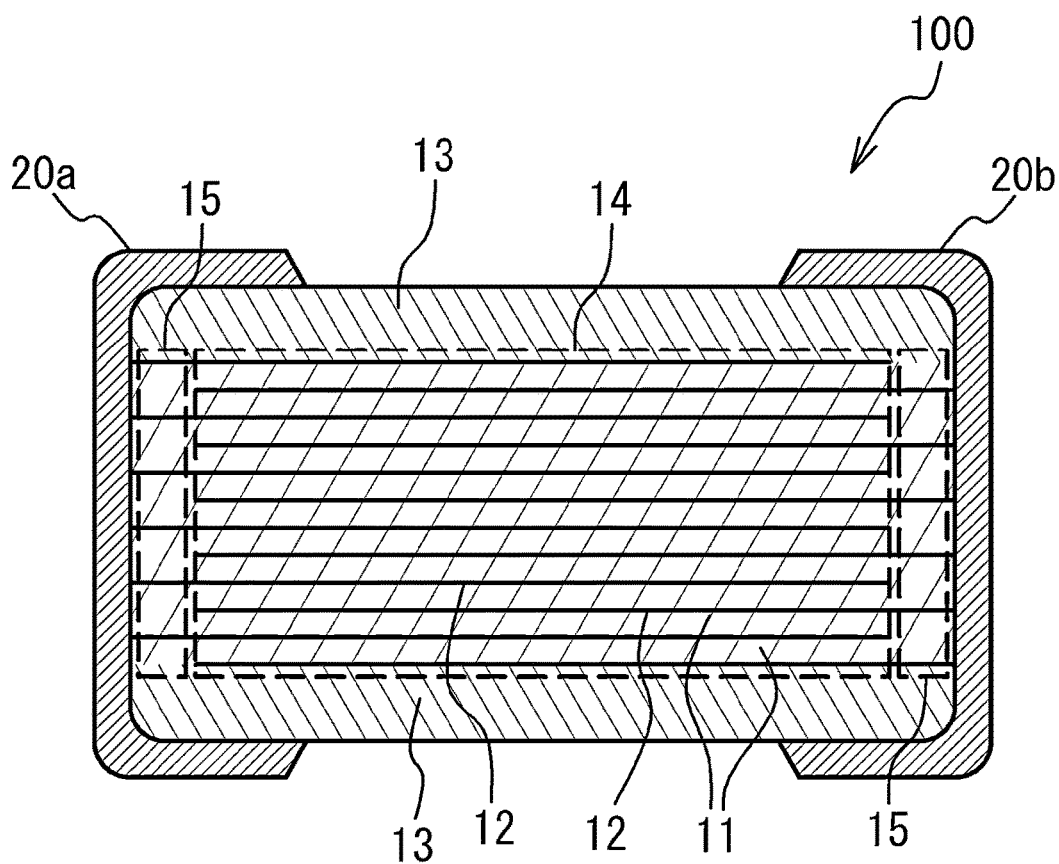
FIG. 2 is a cross-sectional view taken along line A-A in FIG. 1.
Figure 3:
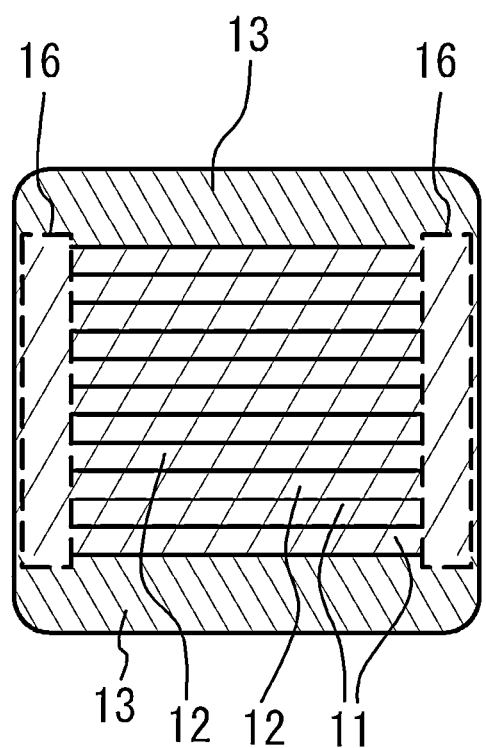
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure in which dielectric layers 11 containing a ceramic material acting as a dielectric and internal electrode layers 12 mainly composed of metal are alternately stacked. In other words, the multilayer chip 10 includes the internal electrode layers 12 facing each other and the dielectric layers 11 sandwiched between the internal electrode layers 12. The edges in the direction in which each internal electrode layer 12 extends are alternately exposed at a first end face provided with the external electrode 20a of the multilayer chip 10 and a second end face provided with the external electrode 20b. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 may be the same as the main component of the dielectric layer 11 or may be different from the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 1.6 mm, a width of 0.6 mm, and a height of 0.8 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

Figure 4:
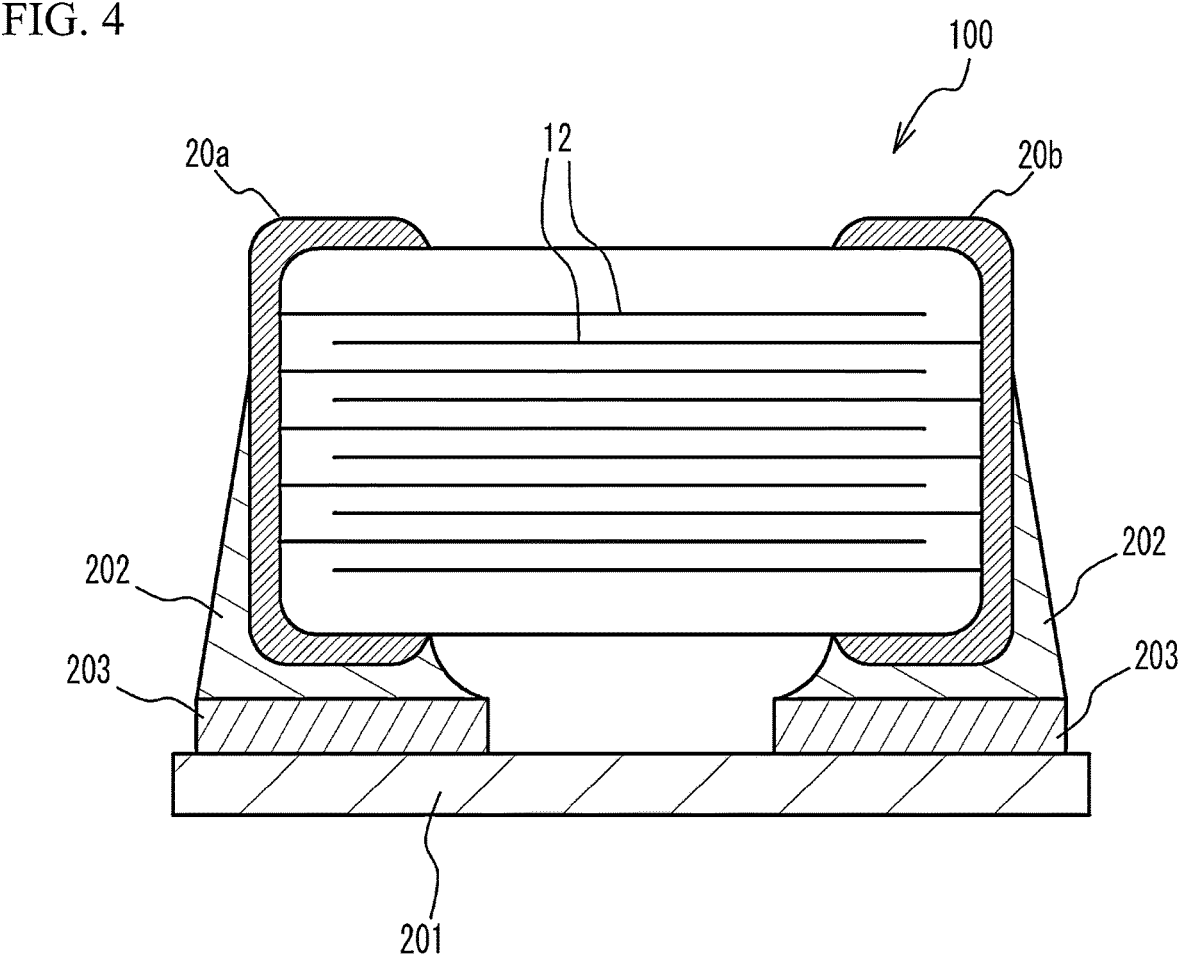
FIG. 4 illustrates a circuit substrate on which a multilayer ceramic capacitor is mounted.

FIG. 4 is a diagram illustrating a state in which the multilayer ceramic capacitor 100 is mounted on a circuit substrate 201. As illustrated in FIG. 4, the lower surface of the multilayer ceramic capacitor 100 in the stacking direction is arranged so as to face a land 203 on the circuit substrate 201. The first external electrodes 20a and the second external electrodes 20b are electrically connected to the circuit substrate 201 independently of each other via a solder 202 to lands 203 on the circuit substrate 201.

Figure 5A:
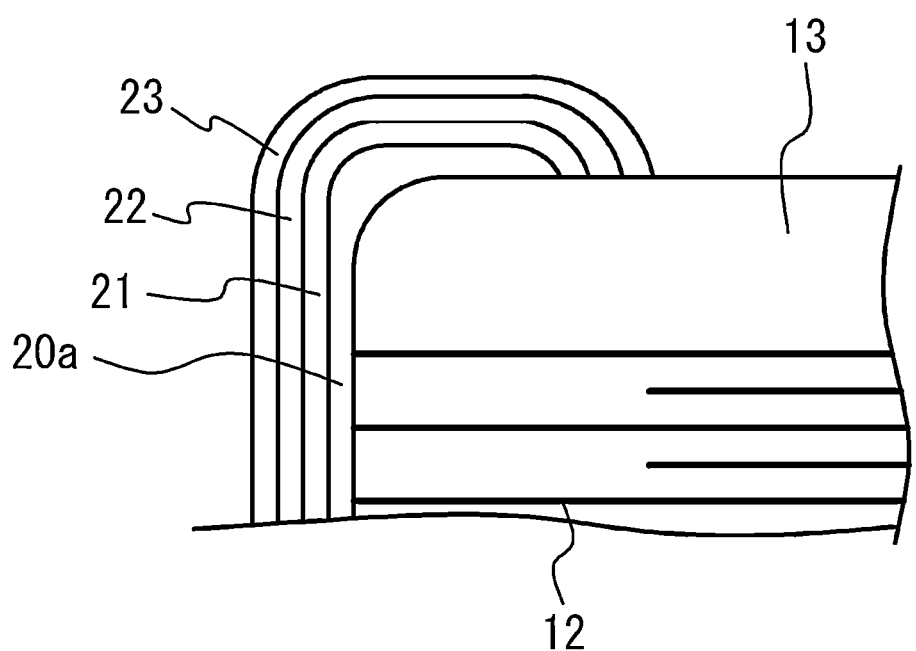
FIG. 5A and FIG. 5B illustrate an enlarged cross sectional view of an external electrode.
Figure 5B:
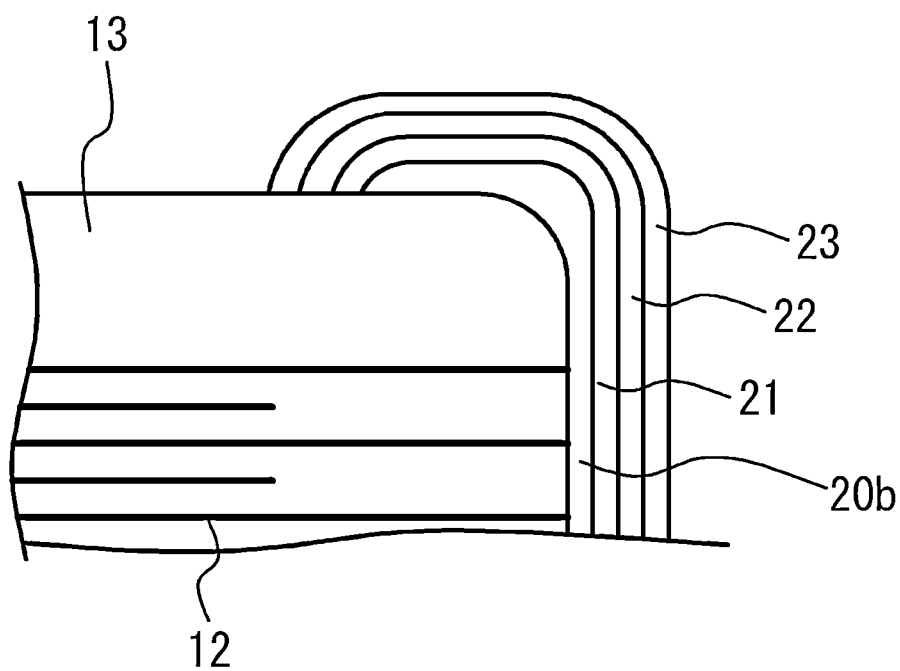

As illustrated in FIGS. 5A and 5B, a plated layer may be provided on the external electrode 20a, and a plated layer may be provided on the external electrode 20b. During plating, the external electrodes 20a and 20b act as base layers. The plated layer is mainly composed of metals such as copper, nickel, aluminum, zinc and tin, or alloys of two or more of these. The plated layer may be a plated layer of a single metal component, or may be a plurality of plated layers of mutually different metal components. For example, the plated layer has a structure in which a first plated layer 21, a second plated layer 22 and a third plated layer 23 are formed in order from the base layer side. The first plated layer 21 is, for example, a copper plated layer. The second plated layer 22 is, for example, a nickel plated layer. The third plated layer 23 is, for example, a tin plated layer.

Figure 6A:
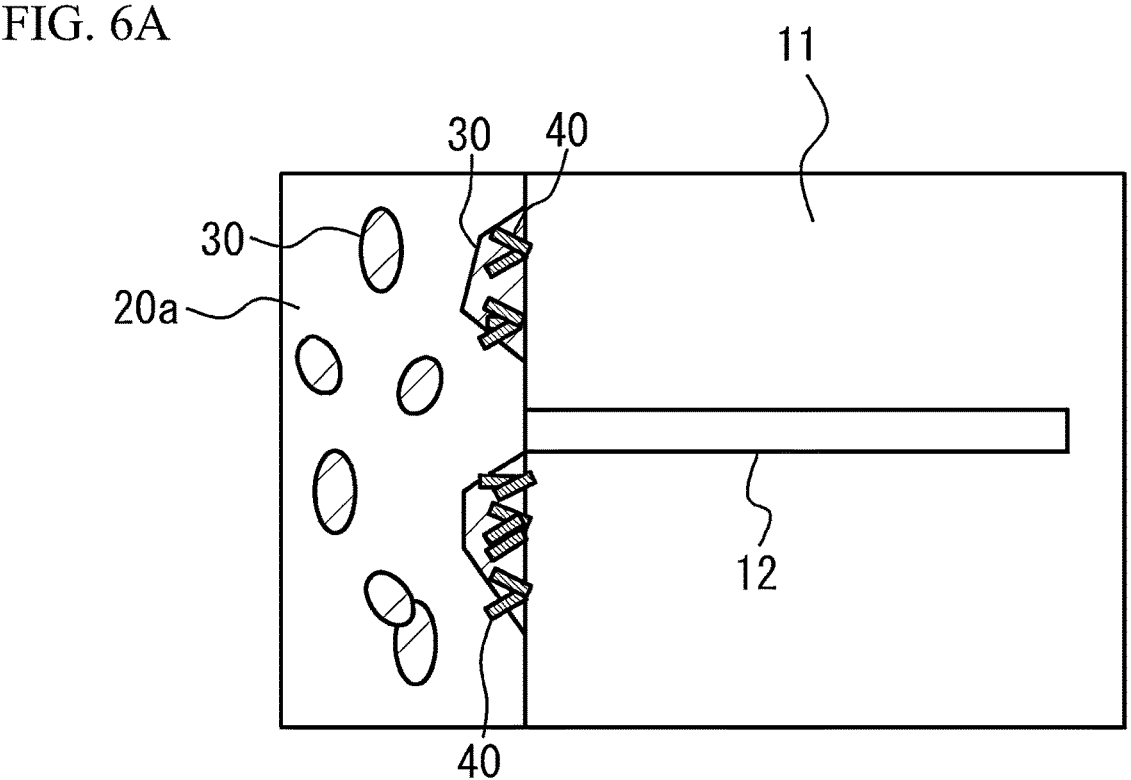
FIG. 6A illustrates an enlarged view near an interface between an external electrode and a multilayer chip.

FIG. 6A is an enlarged view of the vicinity of the interface between the external electrode 20a and the multilayer chip 10. The external electrode 20a will be described below as an example. The external electrode 20b also has the same structure as the external electrode 20a.

The external electrode 20a is a sintered body whose main component is a metal such as copper, and is attached to the fired multilayer chip 10 by baking. The external electrode 20a contains a glass 30 to lower the baking temperature. The glass 30 is, for example, an oxide of barium, calcium, zinc, aluminum, silicon, magnesium, boron or the like. Specifically, the glass 30 is zinc borosilicate glass frit or the like. As illustrated in FIG. 6A, the glass 30 may be inside the external electrode 20a and may not be in contact with either the dielectric layer 11 or the internal electrode layer 12. On the other hand, the glass 30 may be in contact with at least one of the dielectric layer 11 and the internal electrode layer 12. Thus, the external electrode 20a includes the glass 30 in contact with the interface between the multilayer chip 10 and external electrode 20a. When some of the glass 30 is positioned at the interface between the external electrode 20a and the multilayer chip 10, the bonding strength between the external electrode 20a and the multilayer chip 10 is improved.

In addition, the external electrode 20a includes a crystal 40 in contact with the multilayer chip 10 and the glass 30, as illustrated in FIG. 6A. The crystal 40 is a crystal containing the same element as at least one element contained in the dielectric layer 11. By interposing the crystal 40 at the interface between the external electrode 20a and the multilayer chip 10, the bonding strength between the external electrode 20a and the multilayer chip 10 is improved. It is believed that the crystals 40 existing between the dielectric layer 11 and the glass 30 act as a wedge-like role, leading to an improvement in the bonding strength.

By obtaining sufficient bonding strength between the external electrode 20a and the multilayer chip 10, the baking temperature of the external electrode 20a can be lowered. Thereby, the occurrence of cracks in the multilayer chip 10 can be suppressed. As a result, the multilayer ceramic capacitor 100 has sufficient moisture resistance. As described above, the multilayer ceramic capacitor 100 according to the present embodiment can achieve high reliability.

It should be noted that since sufficient bonding strength can be obtained between the external electrode 20a and the multilayer chip 10, it is not necessary to add a large amount of the glass 30 to the external electrode 20a. In this case, the protrusion of the glass component to the outer surface of the external electrode 20a is suppressed, and the plating coverage of the plated layer can be increased. For example, the total area of the glass 30 can be reduced to 20% or less, 15% or less, or 12% or less in the cross section of the external electrode 20a.

For example, when barium titanate is used as the main component ceramic of the dielectric layer 11, the common element between the dielectric layer 11 and the crystal 40 is barium or the like. For example, the element contained in the main component ceramic of the dielectric layer 11 is once dissolved in the glass component contained in the external electrode paste and reprecipitated when the external electrode paste for forming the external electrode 20a is baked. The crystal 40 is formed by this reprecipitation. For example, the crystals 40 are considered to exist in the form of a composite composition of the main ceramic component of the dielectric layer 11 and the glass 30, rather than having the same composition as the main component ceramic of the dielectric layer 11.

The crystal 40 has a shape with a long diameter and is fibrous (needle-like or rod-like). When the crystal 40 has a needle-like or rod-like shape, the crystal 40 acts as a wedge connecting the external electrode 20a and the multilayer chip 10, so that the bonding strength between the external electrode 20a and the multilayer chip 10 is increased.

When the crystal 40 does not have a sufficient long diameter, there is a risk that sufficient bonding strength between the external electrode 20a and the multilayer chip 10 cannot be obtained. Therefore, it is preferable to set a lower limit for the long diameter of the crystal 40. For example, the lengthwise dimension of the crystal 40 is preferably 100 nm or more, more preferably 300 nm or more, and even more preferably 600 nm or more. For example, the long diameter of the crystal 40 can be directly measured using the length measurement function of the SEM device using a polished sample.

On the other hand, when the long diameter of the crystal 40 is too long, the effect of improving the bonding strength of the external electrodes may not be obtained. This is because the crystal grows along the external electrode interface. Therefore, it is preferable to provide an upper limit to the long diameter of the crystal 40. For example, the long diameter of the crystal 40 is preferably 2000 nm or less, more preferably 1500 nm or less, even more preferably 1000 nm or less.

Figure 6B:
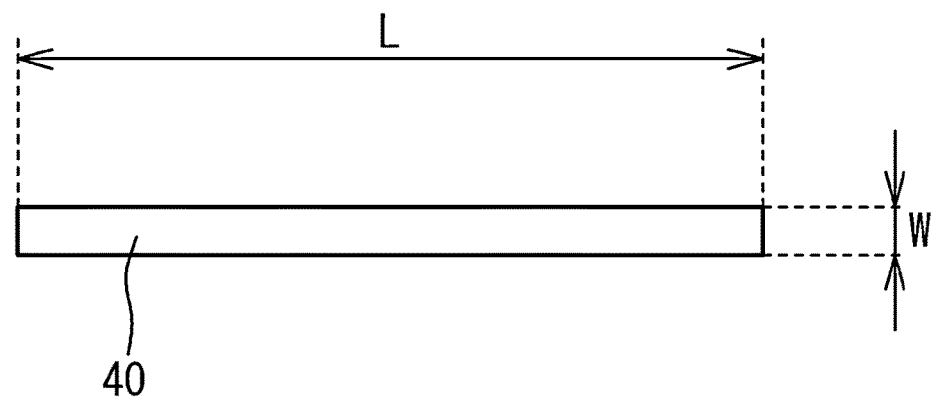
FIG. 6B illustrates an aspect ratio.

When the short diameter of the crystal 40 is too long, the function as a wedge is weakened, and there is a risk that sufficient adhesion between the external electrode 20a and the multilayer chip 10 cannot be obtained. Therefore, it is preferable to set a lower limit for the aspect ratio of the crystal 40. FIG. 6B illustrates the aspect ratio. First, let the length of the crystal 40 be the length L in the cross section obtained by polishing. Let the width W be the average width of each crystal 40. The aspect ratio is L/W. For example, the aspect ratio of the crystal 40 is 3 or more and 35 or less, 5 or more and 20 or less, or 8 or more and 15 or less.

When a sufficient amount of the crystals 40 is not formed in the external electrode 20a, there is a risk that sufficient bonding strength cannot be obtained between the external electrode 20a and the multilayer chip 10. Therefore, it is preferable to set a lower limit on the amount of the crystals 40. For example, the total area of the crystals 40 is preferably 2% or more, more preferably 5% or more, and 8% or more, with respect to the cross section of the glass in the external electrode 20a that is in contact with the multilayer chip 10.

On the other hand, when the amount of the crystals 40 in the external electrode 20a is large, there is a risk of deterioration in contact (capacity loss) between the internal electrode layer and the external electrode. Therefore, it is preferable to set an upper limit on the amount of the crystals 40. For example, the total area of the crystals 40 is preferably 40% or less, more preferably 30% or less, and 15% or less in the cross section of the glass in the external electrode 20a that is in contact with the multilayer chip 10.

Further, as illustrated in FIG. 6A, the crystal 40 preferably extends into the glass 30 from the interface between the external electrode 20a and the multilayer chip 10. Also, the crystal 40 preferably extends through the glass 30 from the interface between the external electrode 20a and the dielectric layer 11. Moreover, it is preferable that the crystal 40 protrude into the multilayer chip 10 from the interface between the external electrode 20a and the multilayer chip 10. According to this configuration, the adhesion between the crystal 40 and the glass 30 is improved, and as a result, the bonding strength between the external electrode 20a and the multilayer chip 10 is improved.

The multilayer ceramic capacitor 100 is classified into Class 2 in the EIA standard in which the main component ceramic of the dielectric layers 11 is a ferroelectric such as barium titanate, and Class 1 in which the main component ceramic of the dielectric layers 11 is a normal dielectric such as zirconate or the like. Since the normal dielectric is chemically stable, there is a possibility that sufficient adhesion cannot be obtained between the dielectric layer 11 and the glass 30. Therefore, when the main component ceramic of the dielectric layer 11 is a normal dielectric, providing the crystal 40 can compensate for the adhesion between the dielectric layer 11 and the external electrode 20a. As described above, the present embodiment provides a particularly remarkable effect when the main component ceramic of the dielectric layer 11 is a normal dielectric.

Figure 7:
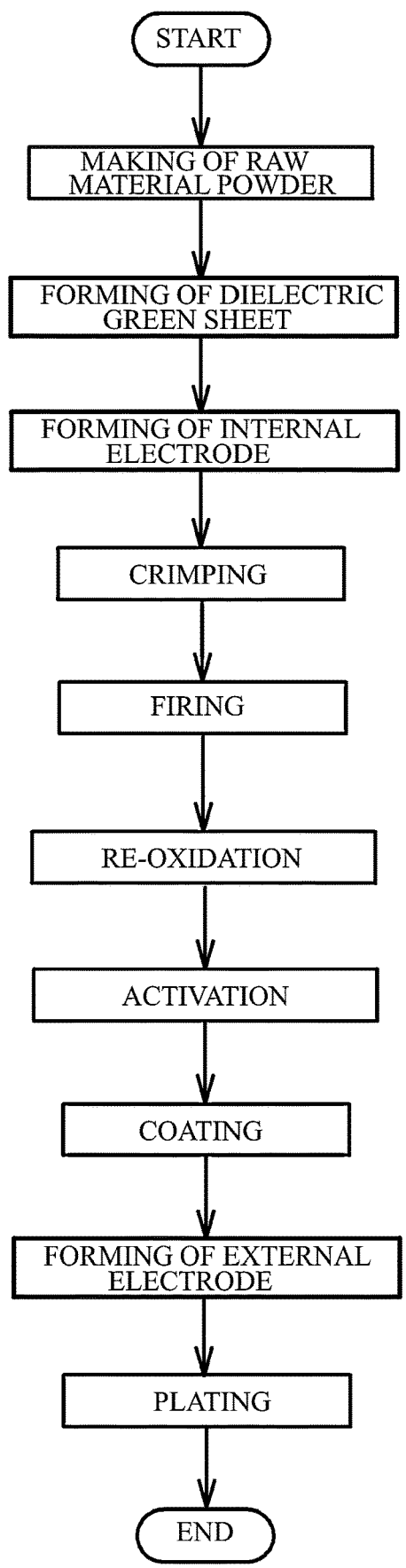
FIG. 7 is a flowchart of a manufacturing method of a multilayer ceramic capacitor.

Next, a description will be given of a manufacturing method of the multilayer ceramic capacitors 100. FIG. 7 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

(Forming of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 8A:
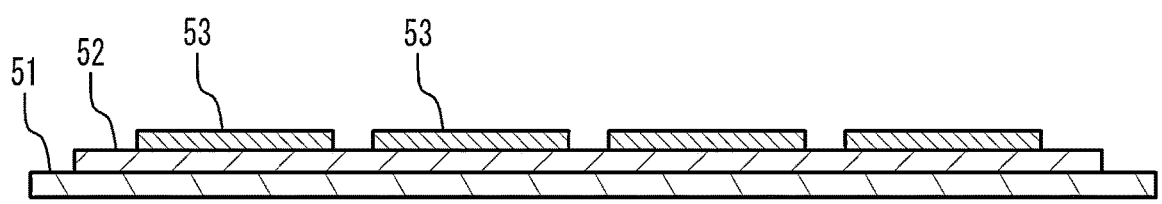
FIG. 8A and FIG. 8B illustrate a stacking process of a first embodiment.

(Forming of internal electrode) Next, as illustrated in FIG. 8A, an internal electrode pattern 53 is formed on the dielectric green sheet 52. In FIG. 8A, as an example, four parts of the internal electrode pattern 53 are formed on the dielectric green sheet 52 and are spaced from each other. The dielectric green sheet 52 on which the internal electrode pattern 53 is formed is a stack unit. A metal paste of the main component metal of the internal electrode layer 12 is used as the internal electrode pattern 53. The forming method of the internal electrode pattern 53 is such as a printing, a sputtering, a vapor deposition or the like.

Figure 8B:
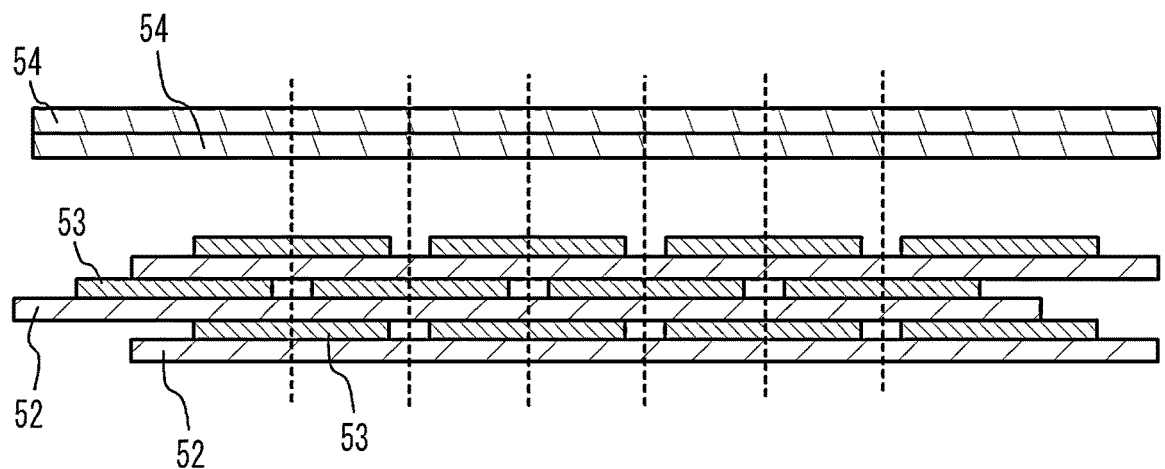

(Crimping Process) Next, the dielectric green sheets 52 are peeled from the base materials 51. As illustrated in FIG. 8B, the stack units are stacked. A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 8B, the multilayer structure is cut along a dotted line. The components of the cover sheet 54 may be the same as those of the dielectric green sheet 52. Additives of the cover sheet 54 may be different from those of the dielectric green sheet 52.

(Firing process) The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. Thus, the multilayer chip 10 is formed.

(Re-oxidizing process) After that, a re-oxidizing process may be performed in $N_2$ gas atmosphere in a temperature range of 600 degrees C. to 1000 degrees C.

(Activation Process) Next, the two end faces of the multilayer chip 10 where the internal electrode layers 12 are exposed are subjected to activation for enhancing surface activity. For example, after immersing the two end faces of the multilayer chip 10 in hydrochloric acid, they are washed with pure water and dried. Alternatively, the surface activity of the end faces of the multilayer chip 10 may be enhanced by sandblasting the two end faces of the multilayer chip 10.

In addition or alternatively, the surface activity of the two end faces of the multilayer chip 10 may be enhanced by laser treatment, corona treatment, or the like.

(Coating process) Next, the two end faces of the multilayer chip 10 are coated with an external electrode paste that will become the external electrodes 20a and 20b by a dipping method or the like. The external electrode paste contains the main component metal of the external electrodes 20a and 20b and glass frit.

(Forming of external electrode) Next, the external electrodes 20a and 20b are formed by baking an external electrode paste at, for example, about 700 degrees C. to 900 degrees C.

(Plating process) After that, by a plating process, plated layers of copper, nickel, tin or the like may be formed on the external electrodes 20a and 20b.

According to the manufacturing method according to the present embodiment, by performing the activation process, the element contained in the main component ceramic of the dielectric layer 11 is once dissolved in the glass component contained in the external electrode paste and reprecipitated. The crystals 40 are thereby formed. Therefore, sufficient bonding strength is realized between the external electrodes 20a, 20b and the multilayer chip 10. By obtaining sufficient bonding strength between the external electrodes 20a and 20b and the multilayer chip 10, the baking temperature of the external electrode paste can be lowered. For example, the baking temperature of the external electrode paste can be 750° C. or higher and 850° C. or lower. Thereby, the occurrence of cracks in the multilayer chip 10 can be suppressed. As a result, the multilayer ceramic capacitor 100 has sufficient moisture resistance. As described above, the multilayer ceramic capacitor 100 according to the present embodiment can achieve high reliability.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) 0.5 wt % of silicon dioxide and 0.5 wt % of manganese oxide were added to $(Ba_{0.1}Ca_{0.4}Sr_{0.5})(Zr_{0.95}Ti_{0.05})_3$ having a particle size of 200 nm to 500 nm, and an organic solvent, an organic binder, a plasticizer and a dispersant were added and mixed to form a dielectric slurry. A ceramic green sheet having a thickness of 3.5 μm was formed using forming equipment. A nickel paste was printed as an internal electrode pattern on the ceramic green sheet and dried. After that, a predetermined number of the ceramic green sheets were stacked, crimped and cut into a predetermined size. The ceramic multilayer structure after cutting was fired by nitrogen gas-based weak reduction firing to obtain a multilayer chip. After firing, as an acid treatment, at least the end face of the multilayer chip (the face where the internal electrode layers were exposed) was immersed in hydrochloric acid, followed by pure cleaning and drying.

After that, a Cu external electrode paste containing zinc borosilicate glass frit and a binder was applied to the end face of the multilayer chip. After drying the Cu external electrode paste, baking treatment was performed at 780° C. in a low oxygen atmosphere, followed by nickel plating treatment and tin plating treatment. Through the above process, a multilayer ceramic capacitor having a dielectric layer thickness of 2.5 μm and a shape of 1608 (length 1.6 mm, width 0.6 mm, height 0.8 mm) was obtained.

(Example 2) The baking temperature of the Cu external electrode paste was set to 800° C. Other conditions were the same as in Example 1.

(Example 3) The baking temperature of the Cu external electrode paste was set to 850° C.

Other conditions were the same as in Example 1.

(Example 4) The end faces of the multilayer chip were sandblasted instead of acid treated. Cu baking temperature was set to 800° C. Other conditions were the same as in Example 1.

(Comparative example 1) In Comparative Example 1, the end face of the multilayer chip was not acid-treated. Other conditions were the same as in Example 1.

(Comparative example 2) In Comparative Example 2, the end face of the multilayer chip was not acid-treated. Other conditions were the same as in Example 2.

(Comparative Example 3) In Comparative Example 3, the end face of the multilayer chip was not acid-treated. Other conditions were the same as in Example 3.

(Crack test) For each of 50 samples of Examples 1 to 4 and Comparative Examples 1 to 3, the presence or absence of cracks in the appearance was confirmed, and the presence or absence of cracks in the cross section obtained by filling with resin and polishing was confirmed. When checking the cross section, it was determined whether crystals of fiber grains containing barium, having a length of 100 nm or more and 500 nm or less, and being in contact with the glass component of the external electrode were formed between the multilayer chip and the external electrode. When the fiber grains were confirmed, it was judged as "presence" of fiber grains. When no fiber grains were observed, it was judged as "no fiber grains". If there was at least one sample in which cracks were confirmed, it was determined that there were cracks. If there was not even a single sample in which cracks were confirmed, it was determined that there were no cracks.

(Moisture resistance load test) Forty samples of each of Examples 1 to 4 and Comparative Examples 1 to 3 were mounted on a substrate, and then subjected to a humidity load test for 1000 hours under the conditions of 85° C. temperature, 85% relative humidity, and 100V DC. Deterioration of characteristics (decrease in insulation and capacity) and abnormal appearance (for example, cracks, peeling of external electrodes, etc.) were confirmed. If there was at least one sample in which at least one of deterioration in characteristics and abnormality in appearance was confirmed, the humidity resistance load was judged to be bad "x". If there was not even a single sample in which at least one of exceptional deterioration and abnormal appearance was confirmed, the humidity resistance load was judged to be good "○".

(Bonding Strength Test) Twenty samples of each of Examples 1 to 4 and Comparative Examples 1 to 3 were reflow-mounted on a predetermined board, and then a pressure of 20 N was applied from the side for 60 seconds. If there is at least one sample in which peeling of the external electrode was confirmed, the bonding strength was judged as good "x". If there was not even a single sample in which peeling of the external electrode was confirmed, the bonding strength was judged to be good "○".

(Overall judgment) If it was judged that there were no cracks, the humidity load was judged to be pass "○", and the bonding strength was judged to be good "○", the overall judgment was judged to be good "○". If cracks were determined to be "presence" or at least one of the humidity load resistance and bonding strength was determined to be bad "x", the overall judge was determined to be bad "x". Table 1 shows the results of each test.

TABLE 1

| | SURFACE PROCESSING | FIRING TEMPERATURE | FIBER GRAIN | CRACK | HUMIDITY RESISTANCE LOAD | BONDING STRENGTH | OVERALL JUDGE |
|---|---|---|---|---|---|---|---|
| EXAMPLE 1 | ACID | 780° C. | EXIST | NONE | ○ | ○ | ○ |
| EXAMPLE 2 | ACID | 800° C. | EXIST | NONE | ○ | ○ | ○ |
| EXAMPLE 3 | ACID | 850° C. | EXSIT | NONE | ○ | ○ | ○ |
| EXAMPLE 4 | SANDBLAST | 800° C. | EXSIT | NONE | ○ | ○ | ○ |
| COMPARATIVE EXAMPLE 1 | NONE | 780° C. | NONE | NONE | x | x | x |
| COMPARATIVE EXAMPLE 2 | NONE | 800° C. | NONE | EXIST | x | ○ | x |
| COMPARATIVE EXAMPLE 3 | NONE | 850° C. | NONE | EXIST | x | ○ | x |

First, in Examples 1 to 4, crystals of fiber grains containing the same element (barium) as at least one of the elements contained in the dielectric layer and in contact with the glass of the multilayer chip and the external electrode were confirmed. It is thought that this was because the activation treatment was applied to both end faces of the multilayer chip before the external electrode paste was baked. On the other hand, in Comparative Examples 1 to 3, no crystals of fiber grains were observed. It is thought that this was because the both end faces of the multilayer chip were not subjected to activation treatment before the external electrode paste.

For all of Examples 1 to 4, the overall judgment was judged to be good "○". It is thought that this was because crystals of fiber grains were formed between the multilayer chip and the external electrodes, improving the reliability.

On the other hand, for Comparative Examples 1 to 3, the overall judgment was judged to be bad "x". In Comparative Example 1, no cracks were observed, but the humidity load resistance and bonding strength were judged to be bad "x". It is thought that this was probably because although cracks did not occur because the baking temperature of the Cu external electrode paste was lowered, sufficient moisture resistance and sufficient bonding strength could not be obtained because fiber grains were not formed. It is thought that this was because, in Comparative Examples 2 and 3, the bonding strength was obtained by increasing the baking temperature of the Cu external electrode, but cracks occurred because fiber grains were not formed, and sufficient moisture resistance was not obtained.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
a multilayer chip having a plurality of dielectric layers and a plurality of internal electrode layers that face each other and are stacked together with the plurality of dielectric layers interposed therebetween, one end of each of the plurality of internal electrode layers being exposed from the multilayer chip; and
an external electrode that is provided on an end face of the multilayer chip and is electrically connected to the one end of at least some of the plurality of internal electrode layers and includes a glass component, the end face being an end of the multilayer chip in a direction in which the plurality of internal electrode layers extend,
wherein the external electrode includes a crystal extending into the glass component at an interface between the external electrode and the end face of the multilayer chip, and
wherein the crystal includes an element that is the same as at least one of elements included in the plurality of dielectric layers.

2. The multilayer ceramic electronic device as claimed in claim 1, wherein the element that is the same as at least one of elements included in the plurality of dielectric layers is barium.

3. The multiyear ceramic electronic device as claimed in claim 1, wherein the crystal is a needle-like crystal or a rod-like crystal.

4. The multilayer ceramic electronic device as claimed in claim 1, wherein a lengthwise dimension of the crystal is 100 nm or more.

5. The multilayer ceramic electronic device as claimed in claim 1, wherein the plurality of dielectric layers include zirconate.

6. The multilayer ceramic electronic device as claimed in claim 1, wherein a main component of the external electrode is copper.

7. The multilayer ceramic electronic device as claimed in claim 1, wherein the multilayer ceramic electronic device is a Class 1 capacitor.

8. A circuit substrate comprising:
a substrate; and
the multilayer ceramic electronic device as set forth in claim 1 mounted on the substrate.

9. The multilayer ceramic electronic device as claimed in claim 1, wherein the crystal is extending from the interface between the external electrode and the end face of the multilayer chip and is penetrating the glass component.

10. The multilayer ceramic electronic device as claimed in claim 9, wherein the crystal is protruding into an inside of the multilayer chip.

11. The multilayer ceramic electronic device as claimed in claim 1, wherein the crystal is protruding into an inside of the multilayer chip.

12. A manufacturing method of a multilayer ceramic electronic device comprising:
activating a surface of an end face of a multilayer chip, the multilayer chip having a plurality of dielectric layers and a plurality of internal electrode layers that face each other and are stacked together with the plurality of dielectric layers interposed therebetween, one end of each of the plurality of internal electrode layers being exposed from the multilayer chip, the end face being an end of the multilayer chip in a direction in which the plurality of internal electrode layers extend;
forming an external electrode on the surface activated in the activating, by applying an external electrode paste including a glass component on the surface and baking the external electrode paste; and
forming a crystal in the external electrode, the crystal including an element which is the same as at least one of elements included in the plurality of dielectric layers, the crystal extending into the glass component at an interface between the external electrode and the surface of the end face of the multilayer chip.

13. The method as claimed in claim 12, wherein the element which is the same as at least one of elements included in the plurality of dielectric layers is barium.

14. The method as claimed in claim 12, wherein, in the activating, the surface is immerged into acid or the surface is subjected to a sandblast process.

15. The method as claimed in claim 14, wherein hydrochloric acid is used in the activating.

16. The method as claimed in claim 12, wherein, in the forming of the external electrode, the crystal is formed by dissolving said element in the glass component and, after that, reprecipitating said element.

17. The method as claimed in claim 12, wherein the crystal is a needle-like crystal or a rod-like crystal.

18. The method as claimed in claim 12, wherein the crystal is extending from the interface between the external electrode and the end face of the multilayer chip and is penetrating the glass component.

19. The method as claimed in claim 18, wherein the crystal is protruding into an inside of the multilayer chip.

20. The method as claimed in claim 12, wherein the crystal is protruding into an inside of the multilayer chip.

* * * * *